United States Patent [19]
Cavazza

[11] 3,917,129
[45] Nov. 4, 1975

[54] DOSAGE CAP AND CONTAINER FOR POWDERS OR LIQUIDS

[75] Inventor: Claudio Cavazza, Rome, Italy

[73] Assignee: SIGMA-TAU Industrie Farmaceutiche Riunite S.p.A., Italy

[22] Filed: Jan. 28, 1974

[21] Appl. No.: 437,199

[30] Foreign Application Priority Data
Jan. 31, 1973   Italy .................................. 47981/73

[52] U.S. Cl. .................... 222/454; 73/426; 215/227
[51] Int. Cl.² .................... G01F 11/26; B65D 39/04
[58] Field of Search ............................ 73/426–429, 73/421 B, 421 A; 222/288, 71, 47, 454; 141/135; 401/126; 206/459; 15/104.94; 215/8.7, 227

[56] References Cited
UNITED STATES PATENTS

| | | | |
|---|---|---|---|
| 210,975 | 12/1878 | Stanffer .................................. 73/426 |
| 416,435 | 12/1889 | Benner .............................. 73/426 X |
| 589,775 | 9/1897 | Akeson ............................ 73/426 X |
| 2,026,681 | 1/1936 | Janssens ........................... 73/426 X |
| 3,141,585 | 7/1964 | Emmert .......................... 222/288 X |
| 3,514,008 | 5/1970 | Dorn .................................. 222/47 X |
| 3,528,294 | 9/1970 | Manevy ....................... 73/421 A X |

*Primary Examiner*—Richard C. Queisser
*Assistant Examiner*—Daniel M. Yasich
*Attorney, Agent, or Firm*—Robert E. Burns; Emmanuel J. Lobato; Bruce L. Adams

[57] ABSTRACT

A metering cap for a bottle in which a closure portion is provided with a tube or conduit in communication with a central opening on the closure portion. The conduit has a free end extending into a container which defines a metering chamber open to communicate with the interior of the bottle. The free end of the conduit is spaced from the bottom of the metering chamber. The metering chamber is fixed to the free end of the conduit. The bottle cap accordingly meters out the contents of the metering chamber when inverted and the metering chamber is again filled upon inverting and righting of the bottle. Thus metered delivery and refilling of the metering chamber take place upon each inversion and righting of the bottle.

4 Claims, 3 Drawing Figures

DOSAGE CAP AND CONTAINER FOR POWDERS OR LIQUIDS

The object of the present invention is a cap which has the function of dosaging powdered or liquid substances. The object of the invention is to provide a device of the said type intended to permit in simple manner at the time of use the exact dosaging of the quantity of granular or fluid substance, contained within a bottle of glass or other material, which is required by the consumer.

In accordance with the invention there is provided a device of plastic or other technologically suitable material comprising in combination an internally hollow cylindrical container with conical base whose inner wall defines a chamber intended to receive the amount of substance required by the consumer; a hollow cylindrical conduit — the upper part of which has a larger diameter and is adapted to operate as hermetic closure for a bottle — arranged within said container and sealed perfectly to it via connecting pins between the outer wall of the conduit and the inner wall of the container.

THe connecting pins also permit the sliding of the conduit, where it is necessary, during production, to vary the capacity of the chamber and regulate, accordingly, the dosaging of the substance.

The present invention, so that is may be correctly understood and, accordingly, readily placed in practice, will now be described with reference to the accompanying drawings which illustrate one preferred embodiment of said invention by way of illustration and not of limitation.

In each figure, identical or corresponding parts of the device forming the object of the invention are indicated with the same reference numbers.

Figure 1:
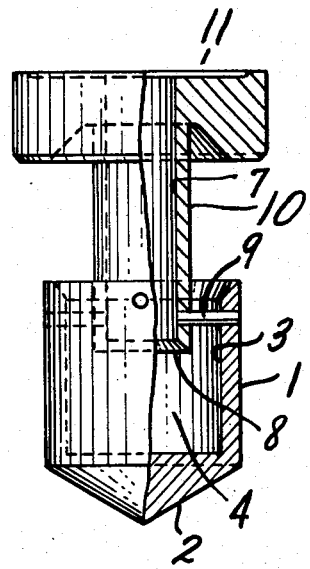
FIG. 1 is a sectional view showing the device as a whole.
Figure 2:
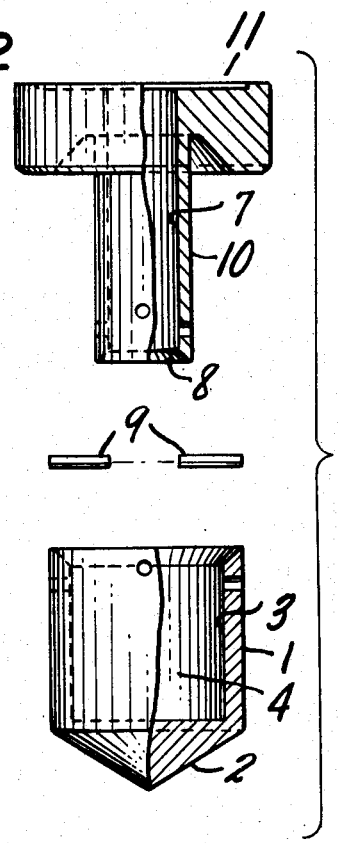
FIG. 2 is a sectional view showing the individual parts of the device.
Figure 3:
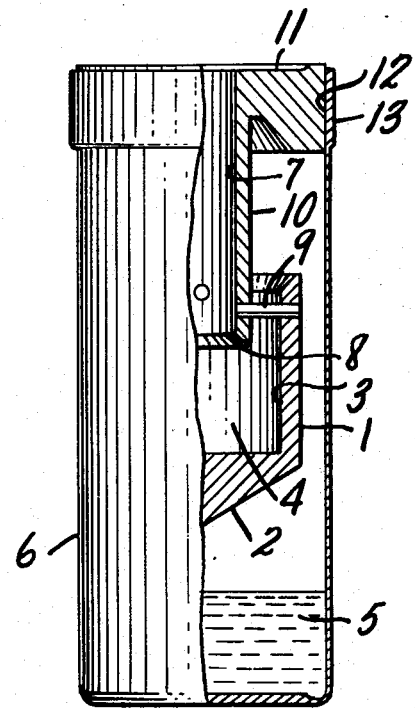
FIG. 3 is a sectional view showing the device inserted in a bottle, ready for use.

Referring to the FIGS., 1 is a hollow cylindrical container with a conical base 2, whose inner wall 3 defines a metering chamber 4 intended to receive the quantity of powdered or liquid substance 5 required by the consumer and contained in the bottle 6.

Within the cylindrical container 1 there is inserted a cylindrical conduit 7 — whose lower end 8 is open and does not rest on the conical base 2 of the container 1 — held perfectly tight by connecting pins 9 — which also permit the sliding thereof during production in order to vary the metering capacity of the chamber 4 and to regulate accordingly the dosaging or metering of the substance 5 — between the outer wall 10 of the conduit 7 and the inner wall 3 of the container 1.

The upper portion 11 of the conduit 7 — adapted to operate as hermetic closure of a bottle 6 — has a larger diameter such as to form a perfect seal with the inner edge 12 of the neck 13 of the bottle 6 and has a central opening open to the conduit 7.

The open lower end of the conduit extends into the upper opening of the container so that it extends into the metering chamber which is circumferentially around the lower open end of the conduit. The opening into the metering chamber has a greater diameter or transverse dimension than the diameter or transverse dimension of the conduit so that the chamber opening is circumferentially spaced from the conduit lower end so that it is filled with contents from the bottle when the bottle is inverted then placed right side up.

The use of the device described above is very simple: the user, with one hand, turns the bottle containining the powdered or liquid substance and provided with the dosaging or metering cap upside down.

This action permits the delivery of the predetermined quantity of powder or liquid which the consumer requires, since the exact dosaging in the double-function cap is effected during manufacture and subsequently upon each act of turning upside down right side up.

The present invention has been described with reference to a preferred embodiment, but it is understood that variants in execution may be made in practice without going beyond the scope of the present patent.

I claim:

1. A metering cap for a bottle for metering a liquid or a powder contained in a bottle, said metering cap comprising a closure portion for closing a bottle in which a liquid or powder is contained and a portion thereof from which it is to be delivered in metered quantities, said closure portion having a central opening, a conduit fixed to said closure portion in communication with said opening and extending away from said opening in a direction for extending away from said opening in a direction for extending into the bottle, said closure portion having a larger transverse dimension than the transverse dimension of said conduit, said conduit having an open free end, a container fixed to said conduit spaced from said closure portion and defining a metering chamber disposed circumferentially spaced from the free end of the conduit and in communication with said free end, said container having an opening into which said free end of said conduit extends and into said metering chamber, said open free end being spaced from the bottom of said metering chamber, whereby when said bottle is inverted and then moved to a rightside up position said metering chamber is filled with contents from said bottle and upon subsequent inversions the contents from the metering chamber are delivered from the bottle and upon positioning rightside up of the bottle contents again fill the metering chamber, and said contents are metered outwardly of said bottle and said metering chamber subsequently filled upon each inversion of the bottle.

2. A metering cap according to claim 1, including, pins on said conduit extending laterally therefrom extending into said container for suspending said container from the conduit.

3. A metering cap according to claim 1, in which said conduit is a rigid tube, and in which said opening in said metering chamber into which said tube extends has a greater diameter than the outer diameter of said tube.

4. In combination, a bottle for a liquid or a powder to be metered therefrom, and a metering cap comprising; a closure portion closing said bottle in which a liquid or powder is contained and from which it is to be delivered in metered quantities, said closure portion having a central opening, a conduit fixed to said closure portion in communication with said opening extending away from said opening into said bottle and in communication therewith, said closure portion having a larger transverse dimension than said conduit, said conduit having an open free end, a container fixed to said conduit spaced from said closure portion and defining a metering chamber disposed circumferentially spaced from the free end of the conduit and in communication therewith, said container having an opening of greater transverse dimension than said conduit into which said free end of said conduit extends and into said metering chamber, said open end being spaced from the bottom of said metering chamber, whereby when said bottle is inverted and then moved to a rightside up position said metering chamber is filled with contents from said bottle and upon subsequent inversions the contents from the metering chamber are delivered from the bottle and upon positioning rightside up of the bottle contents again fill the metering chamber, and said contents are metered outwardly of said bottle and said metering chamber subsequently filled upon each inversion of the bottle.

* * * * *